United States Patent Office 3,472,615
Patented Oct. 14, 1969

3,472,615
GROWING MONOCRYSTALLINE STOICHIO-
METRIC MAGNESIUM ALUMINATE
Chih Chun Wang, Hightstown, N.J., assignor to RCA
Corporation, a corporation of Delaware
No Drawing. Filed Aug. 24, 1967, Ser. No. 662,884
Int. Cl. C01f 7/02
U.S. Cl. 23—52                                    4 Claims

ABSTRACT OF THE DISCLOSURE

Powders of alumina and magnesia and lead fluoride are mixed in a crucible. The mixture is heated in the crucible at about 1200° C. to 1250° C. to form a melt or solution consisting of molten lead fluoride as the solvent, with magnesia and alumina dissolved therein. Conveniently, this melt is solidified. The surface of the solidified melt is then covered with a layer of an inert material such as granulated boron oxide or low melting point glass frit or the like. The covered solidified melt is heated so that the lead fluoride melts and slowly evaporates from beneath a layer of the molten inert material. Large single crystals of magnesium aluminate useful as a laser host or substrate for semiconductor devices are thus deposited from the melt. According to one embodiment, the magnesium aluminate single crystals are purified by heating them in a vacuum. If desired, the step of solidifying the melt prior to the addition of the inert material may be omitted.

BACKGROUND OF THE INVENTION

Field of the invention

This invention relates to improved methods of growing single crystals of magnesium aluminate.

Description of prior art

Monocrystalline ingots of compound semiconductors such as gallium arsenide and indium arsenide have been pulled by the Czochralski technique from a melt of the semiconductive material. To suppress the loss of the volatile constituent, which is arsenic in this case, the surface of the melt may be covered with a layer of molten boric acid, as described in Electronics, June 13, 1966, page 258. However, it is difficult to apply the Czochralski technique to insulators such as spinel, which have much higher melting points than the compound semiconductors.

Ordinary spinel produced by flame fusion contains substantial amounts of excess alumina, and hence is not stoichiometric. Single crystals of stoichiometric magnesium aluminate have been grown by forming a melt consisting of magnesia and alumina dissolved in molten lead fluoride. The lead fluoride solvent is then slowly removed by evaporation, so as to concentrate the solution. As the loss of solvent proceeds, the solution becomes super-saturated and crystals of stoichiometric magnesium aluminate, $MgAl_2O_4$, also known as spinel, are deposited from the solution. Evaporation of the solvent lead fluoride may be slowed down by heating the melt in a crucible which is provided with a crucible cover having a small aperture. For details, see E.A.D. White, "The Growth of Oxide Single Crystals From the Fluxed Melt," in Technique of Inorganic Chemistry, vol. IV, Interscience, New York, 1965. The spinel crystals thus formed may be used as insulating substrates for the deposition of semiconductive films and their fabrication into thin film devices such as those described by Paul K. Weimer in U.S. Patent 3,258,663, issued June 28, 1966. Substrates of single crystal spinel are particularly useful for this purpose, since films of monocrystalline silicon can be deposited on them. Single crystals of magnesium aluminate may also be used as the host material in the preparation of materials suitable for crystal lasers. However, the magnesium aluminate single crystals fabricated by the prior art are smaller and are less perfect than is desirable for these applications.

SUMMARY OF THE INVENTION

A solution is prepared consisting essentially of magnesium oxide and aluminum oxide dissolved in molten lead fluoride. The solution is covered with a layer of material which is inert with respect to said solution, and when molten has a lower specific gravity than said solution. The covered solution is then heated until sufficient lead fluoride evaporates so that single crystals of magnesium aluminate deposit from the solution. According to one embodiment, the crystals thus formed may be further purified by heating them in a vacuum.

DESCRIPTION OF THE PREFERRED
EMBODIMENTS

Example I.—Powdered magnesia, MgO, powdered, alumina, $Al_2O_3$, and powdered lead fluoride, $PbF_2$, are mixed in an inert refractory crucible, which may be for example consist of platinum or iridium, or the like. The precise amount of each powder is not critical. Suitably, the total volume of the mixed powders is about 70% to 90% of the volume of the crucible. In this example, the crucible has a volume of 100 cm.$^3$, and the mixture consists of 426.8 grams lead fluoride, 20.2 grams magnesium oxide, and 51 grams of aluminum oxide. A cover with a small central aperture (about ⅛ of an inch diameter in this example) is placed over the crucible, and the crucible together with its contents is heated at about 1200° C. to 1250° C. for about two hours. The lead fluoride melts, and dissolves some of the aluminum oxide and magnesium oxide present in the crucible. The crucible is then removed from the furnace. The material in the crucible is cooled, and becomes a solid mass.

The solidified mass is covered with a material which is inert with respect to the load fluoride solution, and which has a lower specific gravity when molten than said solution. Preferably, the material utilized melts at a temperature below 1200° C. Suitably, materials for this purpose are oxides such as boron oxide, and glasses which melt below 1200° C. In this example, the material utilized to cover the solidified mask is granulated boron oxide $B_2O_3$. The precise amount of the material utilized is not critical, as long as it is sufficient to cover the surface of the crucible contents. In the examples described herein, the amount of the inert material utilized varies from about 20 to 50 grams.

The aperture cover is then replaced on the crucible, and the crucible with its contents are heated to a temperature of about 1200° C. to 1300° C. In this example, the heating step is performed at about 1235° C. at about 96 hours. During this period, the molten boron oxide floats on the surface of the molten lead fluoride solution as an immiscible layer, and the lead fluoride solvent slowly evaporates from beneath the molten boron oxide layer into the crucible, and leaves the crucible through the aperture in the crucible cover. As the solution or melt becomes concentrated, colorless transparent single crystals of magnesium aluminate are deposited from the melt. These crystals are octahedral in form, and about 4 millimeters on edge.

The precise reasons for the improved results obtained by the presence of a layer of boron oxide over the melt are not certain. Since during the heating step the boron oxide remains on top of the melt as a separate and immiscible molten layer, it is believed that the molten boron oxide layer slows the evaporation of the lead fluoride solvent, and thus aids in the formation of larger and more perfect spinel single crystals. However, the spinel crystals thus obtained are superior in respect to quality and size to those made according to the prior art. A portion of the molten boron oxide evaporates during the heating step.

The purity and homogeneity and high quality of the colorless and transparent single crystals thus formed is attested by optical microscopy and X-ray diffraction techniques. However, the spinel crystals thus grown generally contain a small amount of lead as an impurity. The amount of lead present in the spinel crystals may vary from about 100 to 1000 parts per million. It has unexpectedly been discovered that the spinel single crystals may be further purified by vacuum heating.

Such purification of these spinel single crystals may be obtained by placing the crystals in a refractory crucible. In this example, the crucible consists of iridium, and is positioned inside a quartz chamber surrounded by a water cooled jacket. The crucible and its contents are heated by RF energy for about three hours at about 1200° C. while maintaining the quartz chamber at a pressure of not more than 1 torr. In this example, the pressure utilized is $10^{-3}$ torr. During this heating period, a black coating is deposited in the water-cooled inner wall of the quartz chamber. When the crystal is removed after the heat treatment, it is found to be still colorless and transparent and optically homogenous. The black deposit on the inside of the quartz chamber is found to be metallic lead when examined by X-ray diffraction techniques.

Single crystals of magnesium aluminate were fabricated as described above, and one face on each crystal parallel to the [100] crystal plane was polished. A thin film of monocrystalline silicon was deposited by chemical vapor deposition on the polished face of each crystal. On spinel single crystals which had been purified by heating in a vacuum as described above, the silicon film exhibited a resistivity of 0.8 ohm-cm., and a Hall mobility of 159 cm.$^2$/volt/sec. On similar spinel single crystals which had not been purified by vacuum heatiing, the silicon film exhibited a resistivity of 8000 ohm-cm., and the Hall mobility was too low to measure, but was estimated to be less than 10 cm.$^2$/volt/sec.

*Example II.*—In this example, the crucible utilized has a volume of 400 cm.$^3$, and the aperture in the crucible cover is $\frac{3}{16}$ inch in diameter. The charge consists of 1707 grams lead fluoride, 80.7 grams magnesium oxide, and 203.9 grams alminum oxide. The solidification of the molten charge prior to the addition of the boron oxide is omitted in this example. After the crucible contents are heated to form a melt, and covered with a layer of powdered or granulated boron oxide, the crucible and its contents are heated at 1250° C. for 336 hours. Spinel single crystals in the form of colorless and transparent octahedra up to 10 millimeters on edge are deposited from the melt.

*Example III.*—In this example, the charge consists of 1700 grams of powdered lead fluoride, 50 grams of powdered magnesium oxide, and 100 grams of powdered aluminum oxide. The charge is first mixed in a crucible, next heated at about 850° C. to form a melt, then cooled to form a solid mass. The solid mass in the crucible is covered with a layer of granulated boron oxide. An apertured cover is placed on the crucible, and the crucible and its contents are heated at about 1200° C. to 1250° C. for about three weeks. Colorless transparent single crystals of spinel are deposited in octahedral form. The crystals are over 12 millimeters on edge.

High quality magnesium alminate single crystals as large as 25 millimeters on edge have thus been fabricated. It will be understood that when the crystals thus formed are purified by heating them in a low ambient pressure, the efficiency of the purification process increases as the ambient pressure decreases.

I claim:
1. The method of growing stoichiometric single crystals of MgAl$_2$O$_4$ comprising:
    (a) preparing a melt consisting essentially of a mixture of magnesium oxide and aluminum oxide in molten lead fluoride;
    (b) covering said melt with a layer of a meterial which is inert with respect to said melt and has a specific gravity less than that of said melt; and,
    (c) heating said covered melt at a constant temperature until sufficient lead fluoride evaporates so that single crystals of MgAl$_2$O$_4$ precipitate from said melt.
2. The method as in claim 1, wherein said inert material is boron oxide, and the covered melt is heated at a temperature of about 1200° C. to 1350° C.
3. The method as in claim 1, wherein said single crystals of MgAl$_2$O$_4$ are subsequently heated in a vacuum to remove impurities from said crystals.
4. The method of growing stoichiometric color less transparent single crystals of MgAl$_2$O$_4$ comprising:
    (a) preparing a solution by dissolving stoichiometric quantities of granulated magnesium oxide and granulated aluminum oxide in molten lead fluoride as the solvent;
    (b) solidifying said solution;
    (c) covering the solidified solution thus formed with a layer of granulated boron oxide;
    (d) heating the covered solution at a temperature of about 1200° C. to 1350° C. of a period of time sufficient to precipitate single crystals of MgAl$_3$O$_4$ from said solution; and,
    (e) heating said single crystals at a temperature of about 1200° C. for about one to three hours at a pressure of not more than one torr.

References Cited

UNITED STATES PATENTS

| | | | |
|---|---|---|---|
| 3,304,153 | 2/1967 | Bakker et al. | 23—52 |
| 3,370,963 | 2/1968 | Bonner et al. | 23— 52 X |

OTHER REFERENCES

"Electronics," June 13, 1966, p. 258.
Jonassen et al: "Technique of Inorganic Chemistry," vol. 4, Interscience Publishers, New York, 1965, p. 37.
Linares: "Air Force Cambridge Research Laboratories Report, AFCRL–64–971," October 1964, pp. 10 and 11.

HERBERT T. CARTER, Primary Examiner